US007195466B2

(12) United States Patent
Kobayashi et al.

(10) Patent No.: US 7,195,466 B2
(45) Date of Patent: Mar. 27, 2007

(54) FUEL PUMP HAVING ELECTRIC MOTOR INTEGRALLY CONTAINED IN SINGLE HOUSING

(75) Inventors: Masayuki Kobayashi, Kasugai (JP); Eiji Iwanari, Chiryu (JP)

(73) Assignee: Denso Corporation (JP)

( * ) Notice: Subject to any disclaimer, the term of this patent is extended or adjusted under 35 U.S.C. 154(b) by 191 days.

(21) Appl. No.: 10/864,414

(22) Filed: Jun. 10, 2004

(65) Prior Publication Data

US 2004/0253125 A1 Dec. 16, 2004

(30) Foreign Application Priority Data

Jun. 11, 2003 (JP) ............................ 2003-166188

(51) Int. Cl.
*F04B 17/03* (2006.01)
*H02K 5/22* (2006.01)
*H02K 13/04* (2006.01)

(52) U.S. Cl. .................... 417/423.7; 310/71; 310/237; 417/423.14; 439/354; 439/358

(58) Field of Classification Search .................. 310/71, 310/87, 237; 417/423.3, 423.7, 423.12, 423.14; 439/350, 352, 353, 354, 357, 358
See application file for complete search history.

(56) References Cited

U.S. PATENT DOCUMENTS 4,008,940 A * 2/1977 Foley ......................... 439/354
4,431,244 A * 2/1984 Anhalt et al. ............... 439/358
4,647,128 A * 3/1987 Maros ......................... 439/350
5,040,954 A * 8/1991 Iwai ....................... 417/423.12
5,080,603 A * 1/1992 Mouissie .................... 439/353
5,762,481 A * 6/1998 Oi ........................... 417/423.7
5,942,822 A * 8/1999 Iwata et al. ................... 310/71
6,800,982 B2 * 10/2004 Ebihara ....................... 310/71
6,832,901 B2 * 12/2004 Kuehn et al. .......... 417/423.14
6,863,555 B2 * 3/2005 Ito ............................. 439/353

FOREIGN PATENT DOCUMENTS

JP 11-159412 6/1999

* cited by examiner

*Primary Examiner*—Michael Koczo, Jr.
(74) *Attorney, Agent, or Firm*—Nixon & Vanderhye PC

(57) ABSTRACT

A fuel pump having a pumping impeller and an electric motor integrally contained in a cylindrical housing is submerged in a fuel tank of an automotive vehicle. The fuel pump pumps up fuel in the fuel tank and supplies pressurized fuel to an internal combustion engine. To make the fuel pump compact in size, i.e., small in diameter and short in length, a power-receiving connector of the fuel pump is coupled to a power-supplying connector by facing both connectors in the circumferential direction around the axis of the fuel pump. Elongate terminals in the power-receiving connector and brushes are positioned to overlap each other in the rotational direction of the fuel pump.

13 Claims, 7 Drawing Sheets

FUEL PUMP HAVING ELECTRIC MOTOR INTEGRALLY CONTAINED IN SINGLE HOUSING

CROSS-REFERENCE TO RELATED APPLICATION

This application claims priority to JP Application No. 2003-166188 filed 11 Jun. 2003. The entire contents of these applications are incorporated herein by reference.

BACKGROUND OF THE INVENTION

1. Field of the Invention

The present invention relates to a fuel pump that pumps up and pressurizes fuel for supplying the fuel to an internal combustion engine.

2. Description of Related Art

An example of this kind of fuel pump is disclosed in JP-A-11-159412. As shown in FIGS. 9, 11 and 13 attached to the above publication, a power-supplying connector is coupled to a power-receiving connector formed in a motor cover. A pair of coupling pieces 37, 38 of the power-supplying connector are resiliently coupled to a pair of grooves 29, 30 of the power-receiving connector that is formed in a motor cover 4. Both connectors are firmly connected to each other by engaging a projection 41 of the power-supplying connector with a drain hole 27 of the power-receiving connector. Since the coupling structure, i.e., the coupling pieces 37, 38 and the grooves 29, 30, are aligned in the radial direction, it is unavoidable to make the diameter of the motor cover 4 large.

Another structure of a conventional fuel pump is shown in FIG. 8 attached hereto. In this fuel pump 200, a terminal 206 for supplying power to a motor of the fuel pump is located in a power-receiving connector 204 formed at an upper portion of a motor cover 202. The terminal 206 is positioned above brushes 210 for supplying power to the motor. Therefore, an axial length of the fuel pump becomes long.

SUMMARY OF THE INVENTION

The present invention has been made in view of the above-mentioned problems, and an object of the present invention is to provide an improved fuel pump that is compact in size. In particular, an object of the present invention is to reduce a diameter and/or an axial length of the fuel pump.

The fuel pump is composed of a cylindrical housing, a rear cover covering the rear end of the housing, a front cover covering the front end of the housing, an electric motor contained in the housing, and a pump portion disposed between the rear cover and the electric motor. A power-receiving connector to be coupled to a power-supplying connector is formed in the front cover. The electric motor is driven by supplying electric power from an on-board battery through the power-receiving connector. The fuel pump is submerged in a fuel tank of an automotive vehicle. When the pump portion is driven by the electric motor, fuel in the fuel tank is pumped up through a fuel inlet port formed in the rear cover, the pumped up fuel is pressurized in the pump portion, and the pressurized fuel is supplied to an internal combustion engine through an fuel outlet port formed in the front cover.

The power supplying connector is connected to the power-receiving connector by coupling a pair of claws of the former to a pair of hooks of the latter. To make the diameter of the fuel pump small, the pair of hooks are formed at positions offset from the center of the front cover and close to the outer periphery of the front cover. The pair of claws are coupled to the pair of hooks so that each claw faces to each hook along the periphery of the front cover. To make the axial length of the fuel pump short, an elongate terminal in the power-receiving connector and brushes contacting an axial surface of a commutator located at a front end of an armature are positioned in parallel to the axial direction of the fuel pump. Also, the terminal and the brushes are positioned to overlap each other when viewed from a direction perpendicular to the axial direction.

Preferably, drain holes for draining water in the power-receiving connector are formed at positions corresponding to the pair of hooks, so that the drain holes and the hooks are simultaneously formed by molding. Preferably, the fuel outlet port is formed at the center of the front cover, so that a fuel supplying pipe is easily connected to the fuel outlet port regardless of angular positions of the fuel pump mounted on a vehicle body.

Other objects and features of the present invention will become more readily apparent from a better understanding of the preferred embodiment described below with reference to the following drawings.

DETAILED DESCRIPTION OF THE PREFERRED EMBODIMENT

Figure 1:
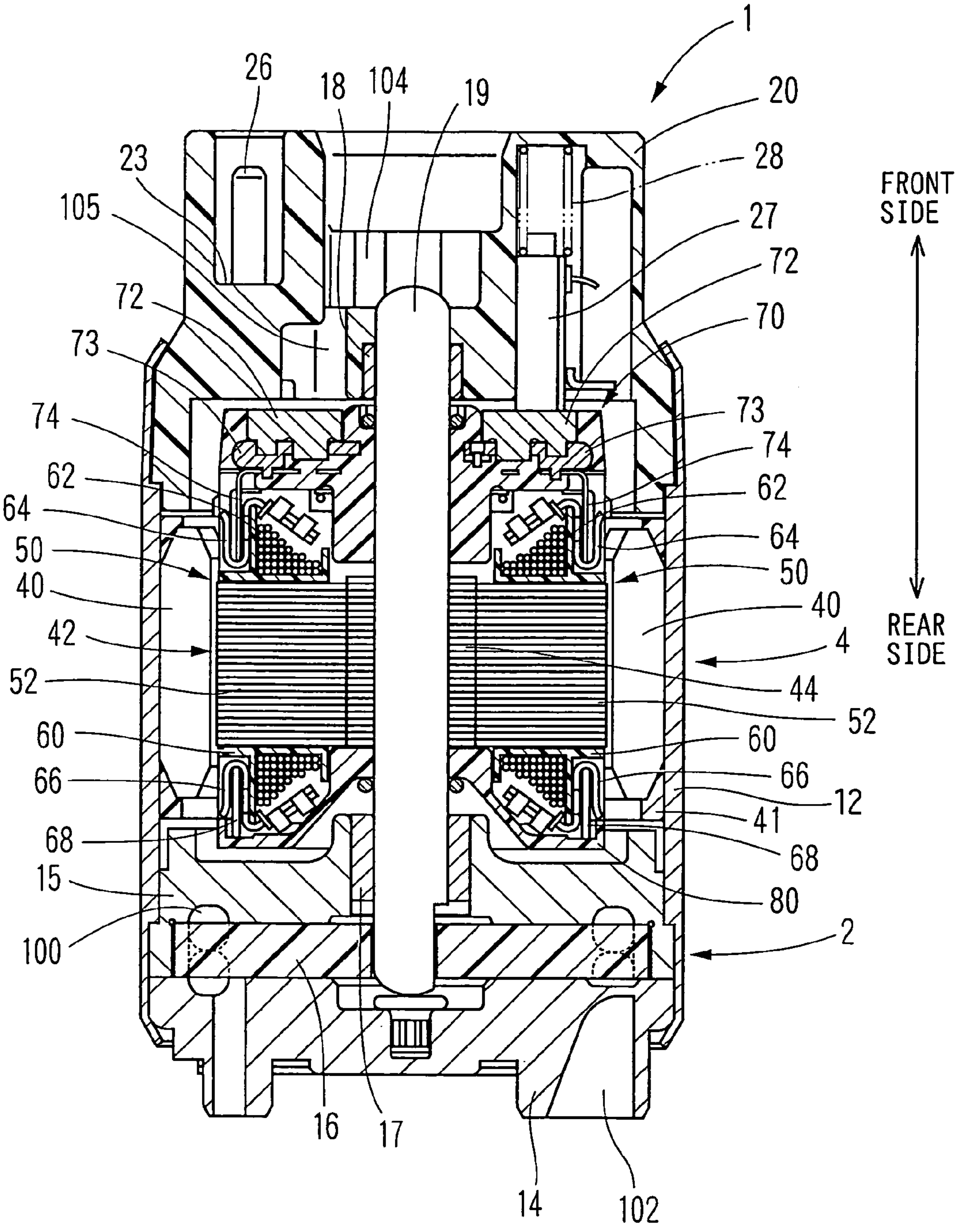
FIG. 1 is a cross-sectional view showing a fuel pump according to the present invention, taken along line I—I in FIG. 2A.

A preferred embodiment of the present invention will be described with reference to FIGS. 1–7B. A fuel pump 1 shown in FIG. 1 is used as a fuel pump for pumping up fuel from a fuel tank, pressurizing and supplying the fuel to an internal combustion engine. The fuel pump 1 is submerged in the fuel tank. The fuel pump 1 is composed of a pump portion 2 and an electric motor 4 for driving the pump portion 2, both being integrally contained in a housing 12. For convenience of explanation, the upper side of FIG. 1 is referred to as a front side of the fuel pump 1 and the bottom side is referred to as a rear side thereof.

The pump portion 2 includes a rear cover 14 from which fuel is sucked into the fuel pump 1, an impeller casing 15 and an impeller 16 disposed between the impeller casing 15 and the rear cover 14. The electric motor 4 is a direct current motor that includes permanent magnets 40 forming a magnetic field, an armature 42 rotating in the magnetic field and a commutator 70 for supplying electric power to the armature 42.

The rear cover 14 and a front cover 20 are disposed at a rear end of an armature shaft 19 and a front end thereof, respectively, and both covers 14, 20 are held by the housing 12. The impeller case 15 and the rear cover 14 are connected together to the cylindrical housing 12 by crimping the rear end of the housing. A C-shaped pumping passage 100 is formed between the impeller case 15 and the rear cover 14. The impeller 16 to be rotated by armature 42 is disposed between the impeller casing 15 and the rear cover 14. The armature 42 is rotatably supported by a bearing 17 held in the impeller casing and another bearing 18 held in the front cover 20.

The impeller 16 is disc-shaped, and plural blades and blade grooves are alternately formed at the outer periphery of the impeller 16. When the impeller 16 is driven by the electric motor 4, fuel is pumped up from a fuel tank into the pumping passage 100 through a fuel inlet port 102 formed in the rear cover 14. The pumped up fuel is pressurized in the pumping passage 100 and flows through a space outside the armature 42. The fuel is supplied to the internal combustion engine through a fuel outlet port 104 formed in the front cover 20. The fuel outlet port 104 communicates with four communication passages 105 formed around the armature shaft 19 in the front cover 20.

Figure 2A:
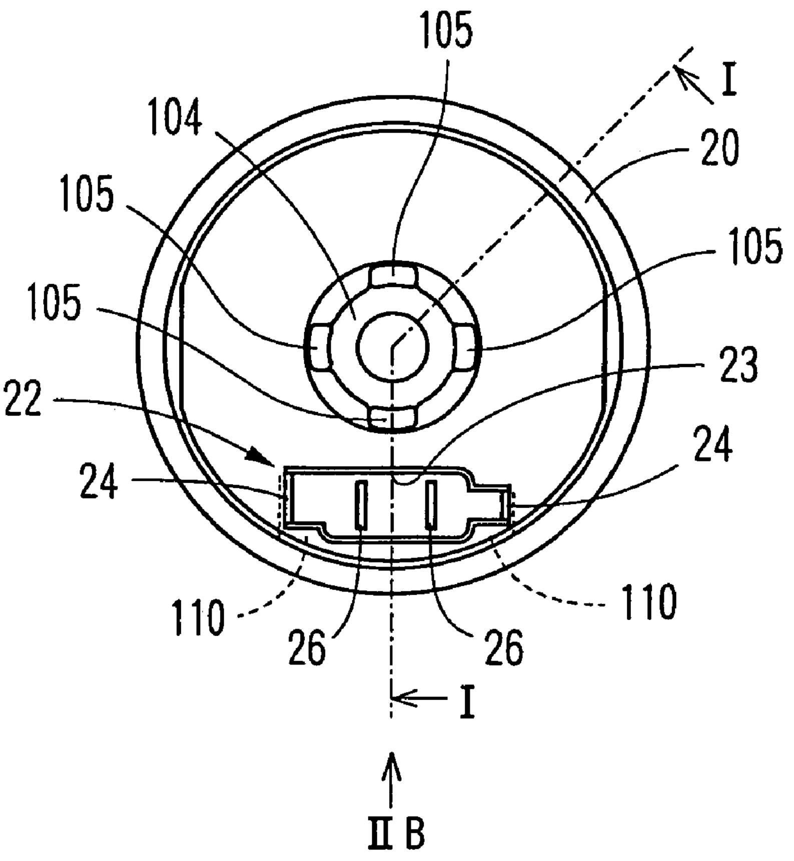
FIG. 2A is a plan view showing a front side of the fuel pump, the front and rear sides being indicated in FIG. 1.
Figure 2B:
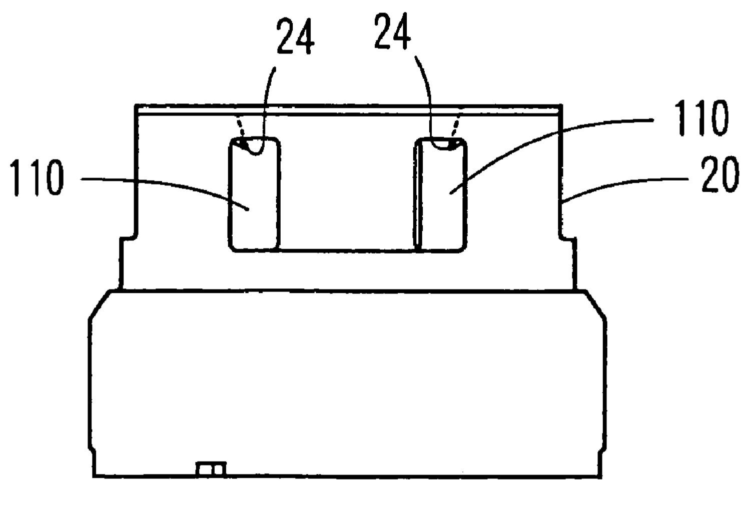
FIG. 2B is a side view showing a front cover of the fuel pump, viewed in direction IIB in FIG. 2A.

The front cover 20 is made of resin and covers the front end of the electric motor 4 where the commutator 70 is located. The fuel outlet port 104 is formed at the center of the front cover 20. As shown in FIG. 2A, a power-receiving connector 22 is formed at a position offset from the center of the front cover 20 and close to the outer periphery thereof. The power-receiving connector 22 has a depressed portion 23 where elongate terminals 26 fixed to the front cover 20 are disposed. As better seen in FIG. 3B, the depressed portion 23 is depressed from the front end of the front cover 20. A pair of hooks 24 to be engaged with a pair of claws 35 formed on a power-supplying connector 30 is formed on the walls of the depressed portion 23 (as better seen in FIG. 6B). A pair of drain holes 110 open to outside of the front cover 20 through the wall of the depressed portion 23 is formed at positions corresponding to the pair of hooks 24, as shown in FIGS. 2A and 2B.

Figure 3A:
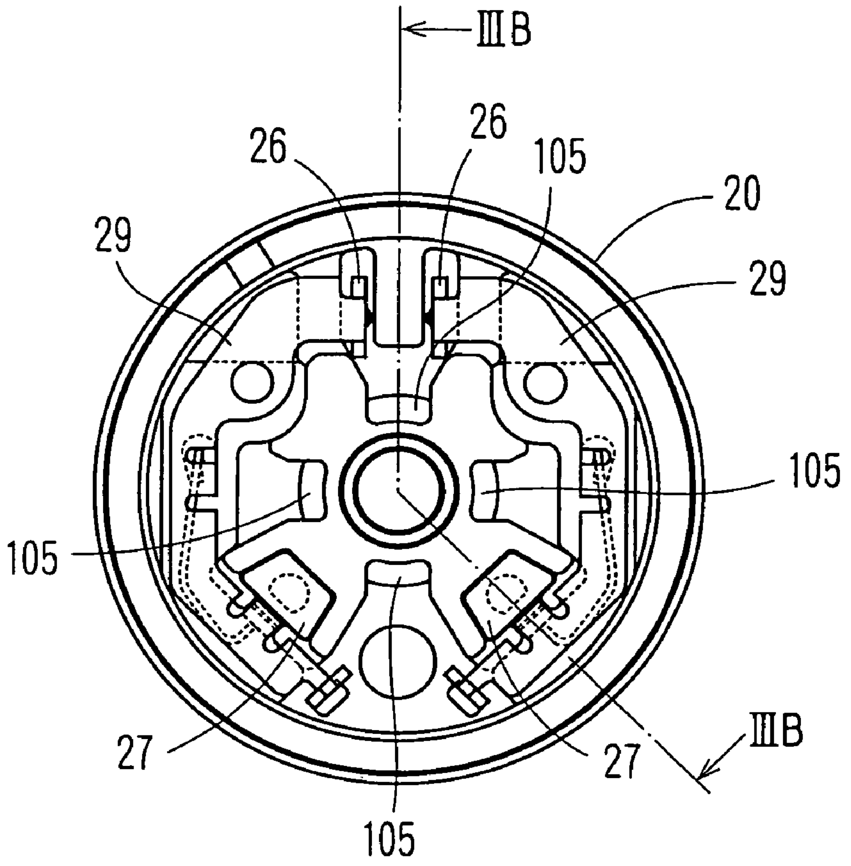
FIG. 3A is a plan view showing the front cover and components contained therein, viewed from the rear side thereof.
Figure 3B:
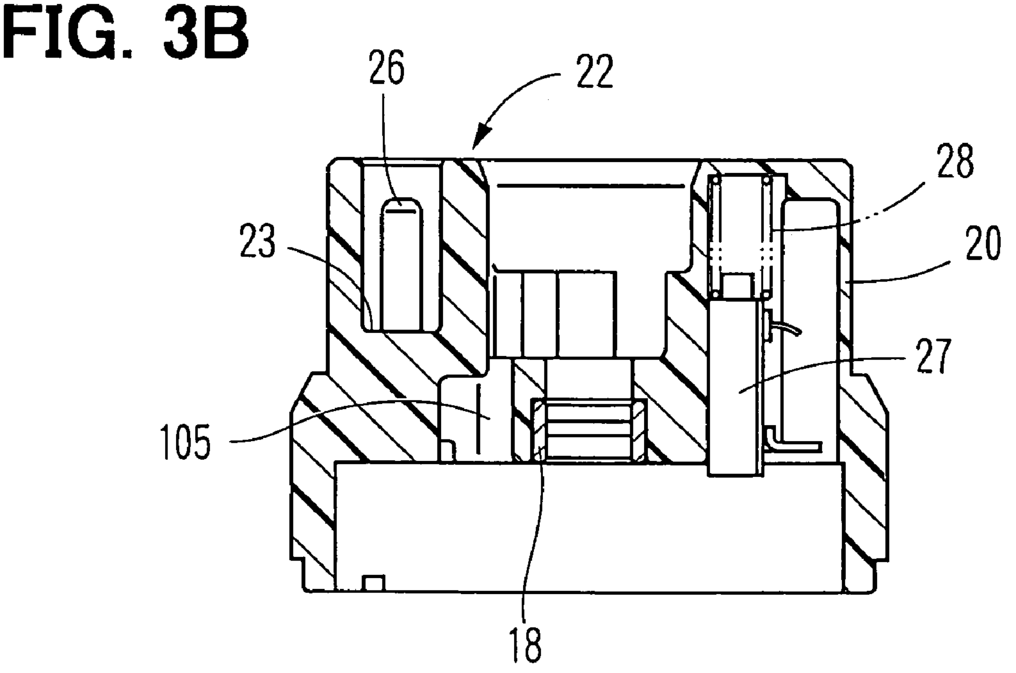
FIG. 3B is a cross-sectional view showing the front cover, taken along line IIIB—IIIB in FIG. 3A.

As shown in FIGS. 3A and 3B, components of the electric motor 4, such as brushes 27, springs 28 biasing the brushes 27 toward the commutator 70, plates 29 electrically connecting the terminals 26 to the brushes 27, are disposed in the rear space of the front cover 20. As shown in FIG. 3A, a pair of plates 29 are positioned circumferentially around the armature shaft 19. As shown in FIG. 3B, the longitudinal directions of the terminal 26 and the brushes 27 are in parallel to the armature shaft 19, and are positioned to overlap each other, viewed from the direction perpendicular to the longitudinal direction of the armature shaft 19.

Figure 4:
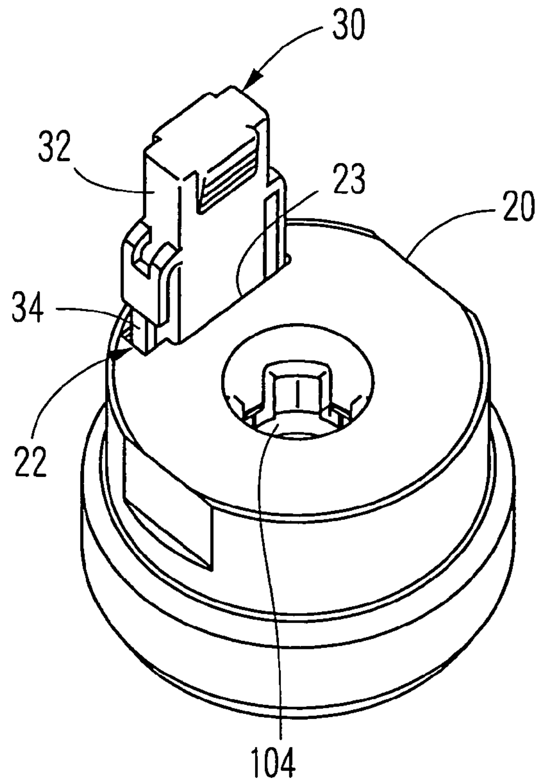
FIG. 4 is a perspective view showing the front cover and a power-supplying connector coupled to a power-receiving connector formed in the front cover.

As shown in FIG. 4, the power-supplying connector 30 couples to the depressed portion 23 of the power-receiving connector 22 formed in the front cover 20. Thus, electric power is supplied from an on-board battery to the electric motor 4 through lead wires 36 (shown in FIGS. 6A and 6B), the power-supplying connector 30 and the power-receiving connector 22.

Figure 5A:
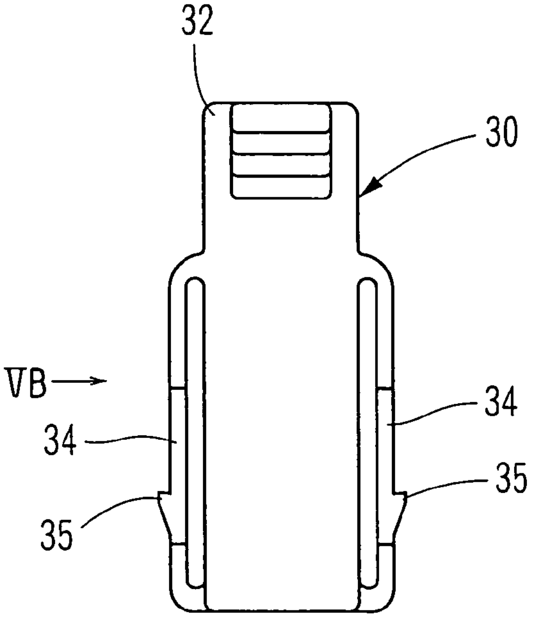
FIG. 5A is a front view showing the power-supplying connector.
Figure 5B:
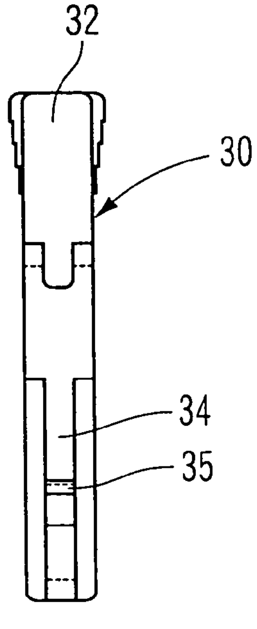
FIG. 5B is a side view showing the power-supplying connector, viewed in direction VB in FIG. 5A.
Figure 6A:
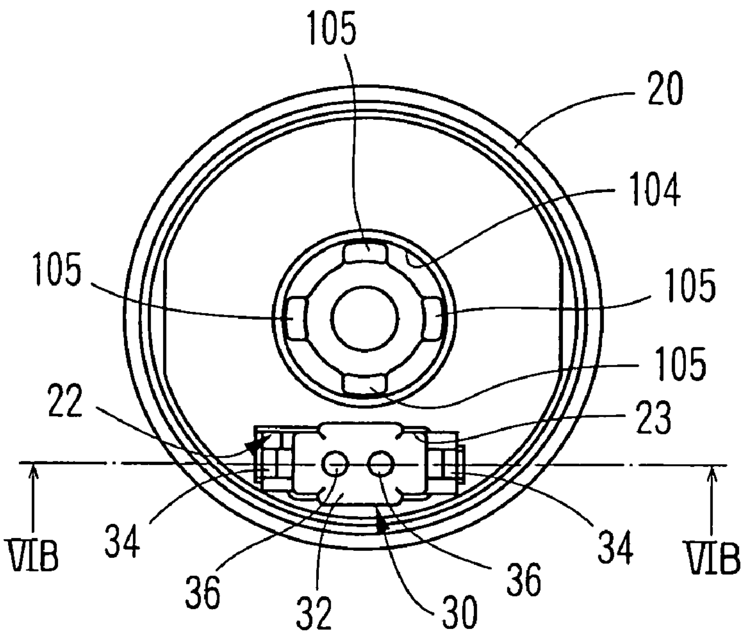
FIG. 6A is a plan view showing the front cover to which the power-supplying connector is coupled.
Figure 6B:
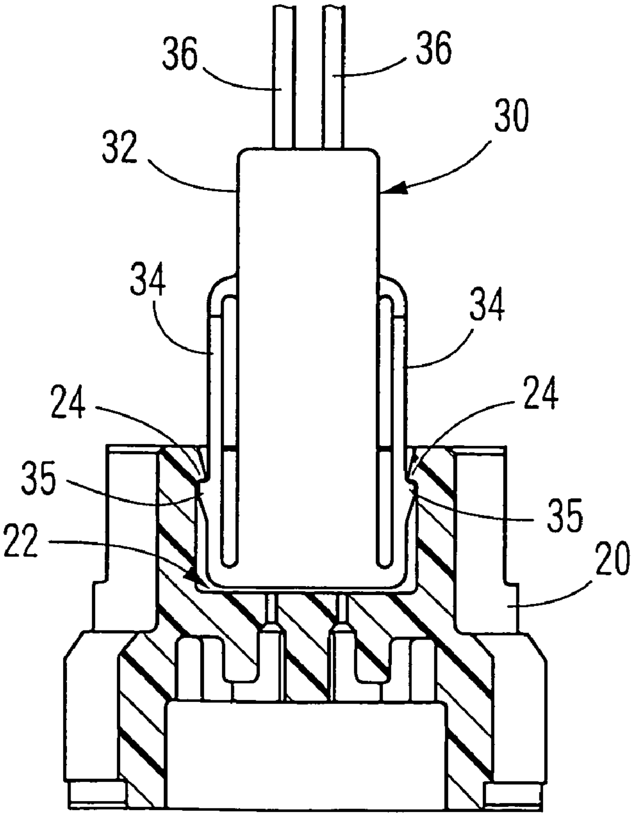
FIG. 6B is a cross-sectional view showing the front cover to which the power-supplying connector is coupled, taken along line VIB—VIB in FIG. 6A.
Figure 7A:
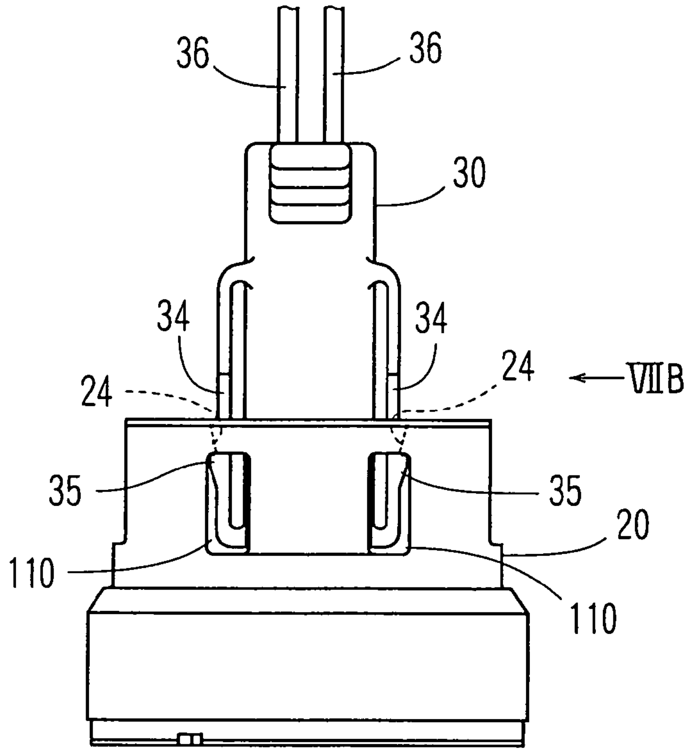
FIG. 7A is a side view showing the front cover to which the power-supplying connector is coupled, viewed in the direction where a pair of drain holes is shown.
Figure 7B:
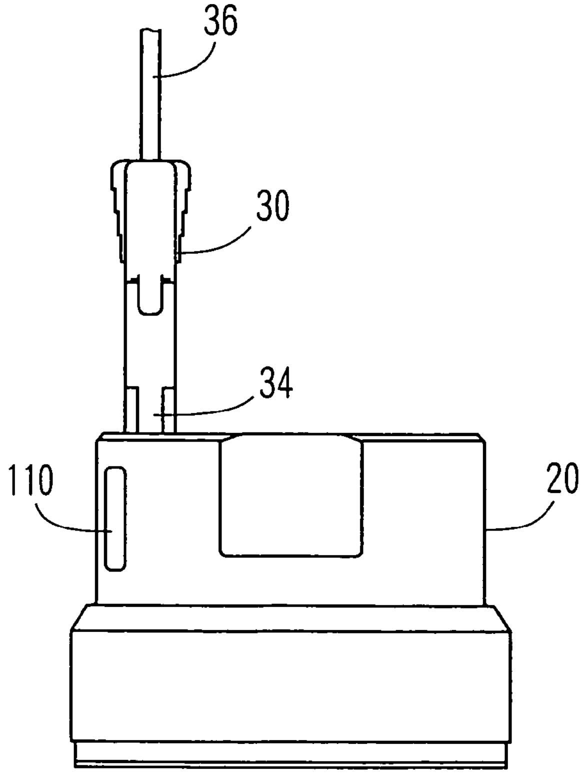
FIG. 7B is another side view showing the front cover to which the power-supplying connector is coupled, viewed in direction VIIB in FIG. 7A.
Figure 8:
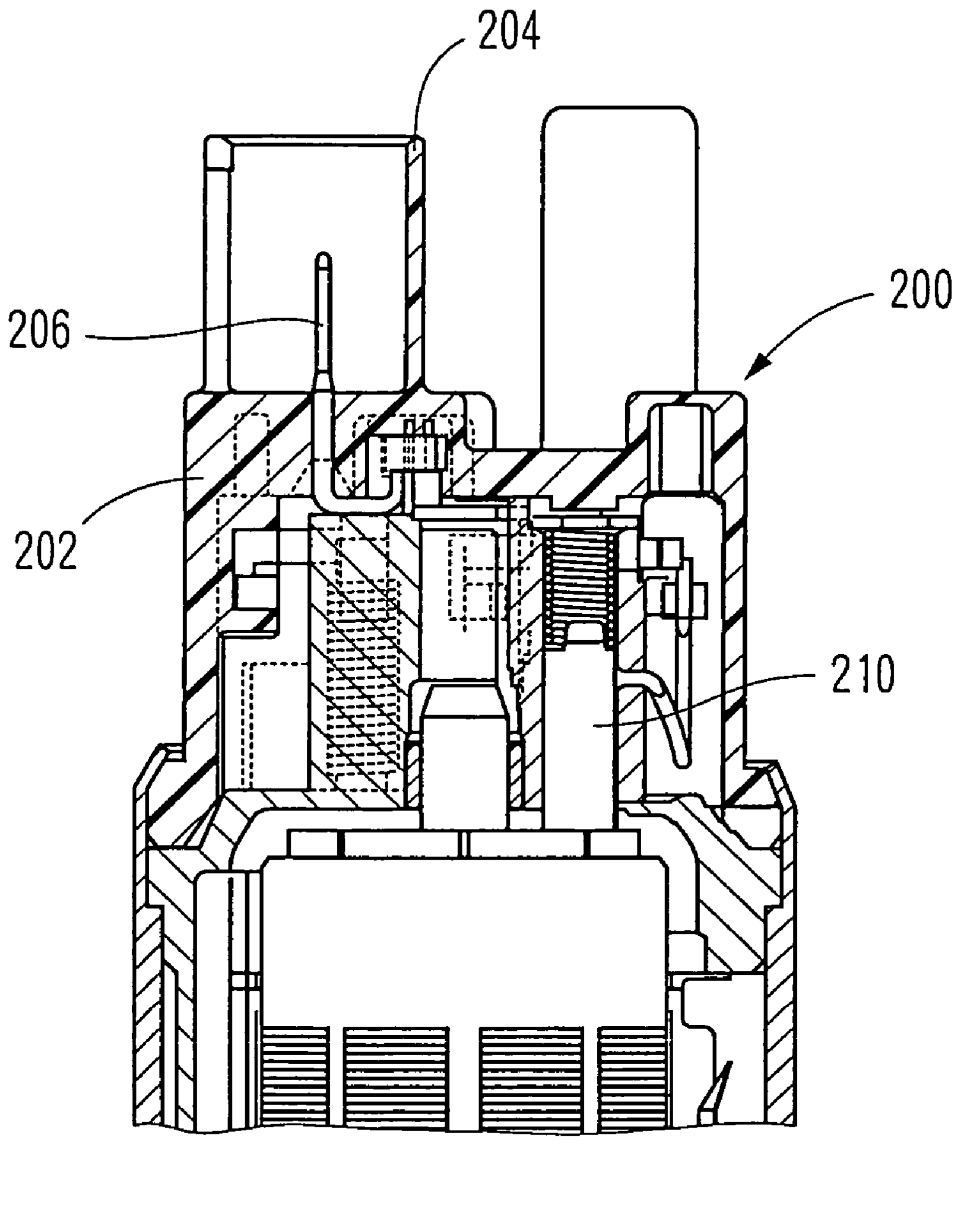
FIG. 8 PRIOR ART
FIG. 8 is a cross-sectional view showing a relevant portion of a conventional fuel pump.

As shown in FIGS. 5A and 5B, the power-supplying connector 30 is composed of a flat box-shaped main body 32 and a pair of strips 34 formed at both sides of the main body 32. Each strip 34 has claw 35 to be engaged with a hook 24 of the power-receiving connector 22. The power-supplying connector 30 is coupled to the power-receiving connector 22 as shown in FIGS. 6A and 6B. The pair of strips 34 partly exposes to outside of the power-receiving connector 22 and partly disposed inside. In other words, each strip 34 is bridged to the main body 32 so that one bridging point is exposed outside and the other bridging point is disposed inside of the power-receiving connector 22. As shown in FIG. 5B, the strip 34 is made narrower than the thickness of the main body 32. The strip 34 is resiliently deformable so that the power-supplying connector 30 can be separated from the power-receiving connector 22 by resiliently deforming the pair of strips 34.

Referring to FIG. 1 again, the structure of the fuel pump 1 will be further explained. Four permanent magnets 40 are fixed to the inner bore of the housing 12 with adhesive at equal intervals, so that S-poles and the N-poles are alternately positioned. The commutator 70 is positioned at the front end of the armature 42, and the rear end of the armature 42 is covered with a motor cover 80. The armature 42 includes a center core 44 firmly connected to the armature shaft 19 and six coil units 50 connected to the outer periphery of the center core 44. Each coil unit is composed of an armature core 52, bobbin 60 and armature coil 62 wound around the bobbin 60.

One end of each armature coil 62 is electrically connected to a terminal 64 positioned at the commutator side of the armature 42. The terminals 64 are positioned a little inside of the outer periphery of the armature 42 so that the terminals 64 does not interfere with fuel flowing through the space between the housing 12 and the armature 42. The terminal 64 is connected to another terminal 74 located further inside of the terminal 64. The other end of each armature coil 62 is electrically connected to a terminal 66 which in turn is connected to a terminal 68. The commutator 70 has six segments 72 which are circularly aligned and insulated from one another. The segment 72 is made of carbon, for example, and electrically connected to the terminal 74 through an intermediate terminal 73. The brushes 27 sildably contacts an axial end surface of the commutator 70.

Advantages in the present invention are as follows. The pair of hooks 24 that engages with the pair of claws 35 of the power-supplying connector 30 is formed in the power-receiving connector 22. Each hook 24 is formed at a position close to the outer periphery of the front cover 20 and apart from the axial center. The pair of claws 35 engage with the pair of hooks 24 on a line perpendicular to the radial direction (on the line VIB—VIB in 6A). Therefore, a space occupied by both connectors 22, 30 along the radial direction can be made small. In other words, the diameter of the fuel pump 1 can be made small. Further, since the motor components, such as brushes 27, springs 28 and plates 29, are positioned in a space formed at the rear side of the front cover 20, the length of the fuel pump 1 can be shortened.

The power-receiving connector 22 is made by depressing the front cover 20 in the axial direction, and the power-supplying connector 30 is inserted into the depressed power-receiving connector 22. Thus, the total length of the fuel pump 1 can be made shorter. Since the drain holes 110 are formed at positions corresponding to the hooks 24, both of the drain holes 110 and the hooks 24 can be made at the same time in a molding process. Since the fuel outlet port 104 is formed in the axial center of the fuel pump 1, the fuel outlet port 104 can be easily connected to a fuel pipe even if the fuel pump 1 is rotated at its mounting position. Further, since a pulsating pressure of compressed fuel is applied to the axial center, vibration of the fuel pump 1 can be made small.

The claw 35 of the power-supplying connector 30 is formed on a thin and narrow strip 34 which is bridged to the main body 32 at two positions. The strip 34 is made to have a sufficient resiliency and mechanical strength. Therefore, a space occupied by the strips 34 and claws 35 can be minimized, and further, the power-supplying connector 30 can be easily detached from the power-receiving connector 22 by resiliently deforming the strips 34. Further, since the terminals 26 and the brushes 27 are positioned to overlap in the rotational direction of the armature 42, the length of the fuel pump can be further shortened.

The present invention is not limited to the embodiment described above, but it may be variously modified. For example, two important features, i.e., positioning the brushes 27 and the terminal 26 in parallel to and to overlap each other (viewed in the direction perpendicular to the axial direction), and forming the pair of hooks 24 along the circumferential direction of the front cover 20, are employed in the foregoing embodiment, it is possible to employ only either one of these two features. Though the hooks 24 are integrally formed with the front cover 20 in the foregoing embodiment, it is also possible to make the hooks 24 separately from the front cover 20. Further, it may be possible to form the hooks 24 at the front surface of the front cover 20 either integrally with or separately from the front cover 20.

Though the power-receiving connector 22 is made in a female shape in the foregoing embodiment, it is possible to make the power-supplying connector 30 in a female shape. The drain holes 110 may be made at other places as long as water retained in the depressed space 23 can be drained. The power-supply connector 30 may or may not be counted as one of the components constituting the fuel pump 1.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A fuel pump for pumping up fuel and supplying the pumped up fuel to an internal combustion engine, the fuel pump comprising:

a cylindrical housing;

a pump portion for pumping up and pressurizing fuel, the pump portion being contained in the housing;

an electric motor including an armature having an armature shaft, and a commutator for supplying electric current to the armature, the electric motor being contained in the housing together with the pump portion, so that the pump portion is driven by the electric motor;

a front cover covering a front axial end of the armature where the commutator is fixed to the armature;

a power-receiving connector having an elongate terminal to be electrically connected to a power-supplying connector, the power-receiving connector being formed in the front cover at a position offset from the center thereof; and brushes slidably contacting the commutator for supplying electric current to the armature, wherein:

the elongate terminal of the power-receiving connector and the brushes are positioned to overlap each other when viewed in a direction perpendicular to a longitudinal direction of the armature shaft.

2. The fuel pump as in claim 1, wherein:

a pair of hooks for coupling the power-supplying connector to the power-receiving connector are formed in the power-receiving connector, the pair of hooks being positioned close to an outer periphery of the front cover.

3. The fuel pump as in claim 2, wherein:

small components constituting the electric motor are positioned in a space formed between the electric motor and the front cover.

4. The fuel pump as in claim 2, wherein:

a fuel outlet port is provided in the front cover at the center thereof.

5. The fuel pump as in claim 2, wherein:

the power-receiving connector is a female connector to be coupled with the power-supplying connector.

6. The fuel pump as in claim 5, wherein:

the power-receiving connector includes a depressed space where the terminal is disposed, and drain holes through which the depressed space communicates with an outside space are formed in the power-receiving connector.

7. The fuel pump as in claim 6, wherein:

the drain holes are a pair of holes formed at positions corresponding to the pair of hooks.

8. The fuel pump as in claim 2, further comprising the power-supplying connector coupled to the power-receiving connector, wherein:

the power-supplying connector includes a pair of claws coupled to the pair of hooks of the power-receiving connector; and each claw is formed on a resilient strip which is bridged to a main body of the power-supplying connector at two positions, one position located outside of the power-receiving connector when both connectors are coupled and at the other position located inside of the power-receiving connector when both connector are coupled.

9. The fuel pump as in claim 3, wherein:

the small components include a pair of plates, each plate electrically connecting the terminal of the power-receiving connector to a brush for supplying electric current to the electric motor, and the pair of plates are circumferentially positioned around the armature shaft.

10. A fuel pump for pumping up fuel and supplying the pumped up fuel to an internal combustion engine, the fuel pump comprising:

a cylindrical housing;

a pump portion for pumping up fuel and pressurizing the pumped up fuel, the pump portion being contained in the housing at a rear side of the housing;

an electric motor for driving the pump portion;

a front cover covering a front side of the housing; and a power-receiving connector having a terminal to be electrically connected to a power-supplying connector, the power-receiving connector being formed in the front cover at a position offset from the center of the front cover, wherein:

a pair of hooks for coupling the power-supplying connector to the power-receiving connector are formed in the power-receiving connector, the pair of hooks being positioned close to an outer periphery of the front cover, and small components constituting the electric motor are positioned in a space formed between the electric motor and the front cover, wherein:

the small components include a pair of plates, each plate electrically connecting the terminal of the power-receiving connector to a brush for supplying electric current to the electric motor, and the pair of plates are circumferentially positioned around the armature shaft.

11. A fuel pump for pumping up fuel and supplying the pumped up fuel to an internal combustion engine, the fuel pump comprising:

a cylindrical housing;

a pump portion for pumping up fuel and pressurizing the pumped up fuel, the pump portion being contained in the housing at a rear side of the housing;

an electric motor for driving the pump portion;

a front cover covering a front side of the housing; and a power-receiving connector having a terminal to be electrically connected to a power-supplying connector, the power-receiving connector being formed in the front cover at a position offset from the center of the front cover, wherein:

a pair of hooks for coupling the power-supplying connector to the power-receiving connector are formed in the power-receiving connector, the pair of hooks being positioned close to an outer periphery of the front cover, and a fuel outlet port is provided in the front cover at the center thereof.

12. A fuel pump for pumping up fuel and supplying the pumped up fuel to an internal combustion engine, the fuel pump comprising:

a cylindrical housing;

a pump portion for pumping up fuel and pressurizing the pumped up fuel, the pump portion being contained in the housing at a rear side of the housing;

an electric motor for driving the pump portion;

a front cover covering a front side of the housing; and a power-receiving connector having a terminal to be electrically connected to a power-supplying connector, the power-receiving connector being formed in the front cover at a position offset from the center of the front cover, wherein:

a pair of hooks for coupling the power-supplying connector to the power-receiving connector are formed in the power-receiving connector, the pair of hooks being positioned close to an outer periphery of the front cover, and the power-receiving connector is a female connector to be coupled with the power-supplying connector, wherein:

the power-receiving connector includes a depressed space where the terminal is disposed, and drain holes through which the depressed space communicates with an outside space are formed in the power-receiving connector.

13. A fuel pump for pumping up fuel and supplying the pumped up fuel to an internal combustion engine, the fuel pump comprising:

a cylindrical housing;

a pump portion for pumping up fuel and pressurizing the pumped up fuel, the pump portion being contained in the housing at a rear side of the housing;

an electric motor for driving the pump portion;

a front cover covering a front side of the housing; and a power-receiving connector having a terminal electrically connected to a power-supplying connector, the power-receiving connector being formed in the front cover at a position offset from the center of the front cover, wherein:

a pair of hooks for coupling the power-supplying connector to the power-receiving connector are formed in the power-receiving connector, the pair of hooks being positioned close to an outer periphery of the front cover, the power-supplying connector includes a pair of claws coupled to the pair of hooks of the power-receiving connector, and each claw is formed on a resilient strip which is bridged to a main body of the power-supplying connector at two positions, one position located outside of the power-receiving connector when both connectors are coupled and at the other position located inside of the power-receiving connector when both connector are coupled.

* * * * *